United States Patent [19]
Miyadera

[11] Patent Number: 6,055,377
[45] Date of Patent: Apr. 25, 2000

[54] CAMERA ACCESSORY AND TRANSMITTER-RECEIVER SYSTEM FOR A CAMERA

[75] Inventor: Shunichi Miyadera, Tokyo, Japan

[73] Assignee: Asahi Kogaku Kogyo Kabushiki Kaisha, Tokyo, Japan

[21] Appl. No.: 09/275,184

[22] Filed: Mar. 23, 1999

[30] Foreign Application Priority Data

Mar. 24, 1998 [JP] Japan ................... 10-093914

[51] Int. Cl.⁷ ................................ G03B 17/18
[52] U.S. Cl. .................. 396/56; 396/281; 396/286
[58] Field of Search .............. 396/56–59, 283, 396/286, 281; 348/211

[56] References Cited

U.S. PATENT DOCUMENTS

| | | | |
|---|---|---|---|
| 4,314,750 | 2/1982 | Orban | 396/281 X |
| 4,884,094 | 11/1989 | Kitaura et al. | 396/57 |
| 5,270,764 | 12/1993 | Ichihara | 396/59 |
| 5,387,955 | 2/1995 | Cocca | 396/59 |
| 5,541,703 | 7/1996 | Suzuka . | |

*Primary Examiner*—W. B. Perkey
*Attorney, Agent, or Firm*—Greenblum & Bernstein, P.L.C.

[57] ABSTRACT

Disclosed is an accessory for a camera which is used separately from the camera. The camera transmits a signal for indicating an operational state thereof. The accessory includes a receiver for receiving the signal and a vibrator which vibrates in accordance with the signal received by the receiver. A transmitter-receiver system for the camera is also disclosed.

14 Claims, 7 Drawing Sheets

CAMERA ACCESSORY AND TRANSMITTER-RECEIVER SYSTEM FOR A CAMERA

BACKGROUND OF THE INVENTION

1. Field of the Invention

The present invention relates to an accessory of a camera which is provided separately from the camera and also relates to a transmitter-receiver system of a camera for informing the photographer of an operational state of the camera.

2. Description of the Related Art

When a picture is taken with a camera with its self-timer in operation, the shutter is generally released when a predetermined period of time (e.g., 10 seconds) elapses after the release button is depressed. A subject which is to be photographed needs to stay still upon the shutter being released to prevent the image of the subject from becoming blurry. Furthermore, since the photographer is usually apart from the camera when taking a picture with the use of self-timer, it is necessary to inform the photographer of the state of an operation of the camera (e.g., whether or not the self-timer is in operation and/or when the shutter is released) in any certain way. For this reason, in a conventional camera having a self-timer, the camera is usually provided with a light emitter (generally an LED) for emitting light (which is usually turned ON and OFF) and/or a sound generator for delivering audible signal to let the photographer know that the self-timer is in operation.

In a camera having a self-timer provided with a function of informing the photographer that the self-timer is in operation by emitting light, the photographer cannot recognize whether the self-timer is in operation unless the photographer keeps an eye on the camera. In a camera having another type of self-timer provided with a function that informs the photographer that the self-timer is in operation by delivering an audible signal, such a self-timer can be inappropriate if used in certain areas where making sound or noise is not preferable (e.g. an art museum or an area for bird watching).

SUMMARY OF THE INVENTION

An object of the present invention is to provide an accessory of a camera which is provided separately from the camera, wherein the accessory makes it possible to inform the photographer of an operational state of the camera without delivering any audible signal or without requiring the photographer to keep an eye on the camera.

To achieve the object mentioned above, according to an aspect of the present invention, there is provided an accessory for a camera which is used separately from the camera, the camera transmitting a signal for indicating an operational state of the camera. The camera includes a receiver for receiving the signal and a vibrator which vibrates in accordance with the signal received by the receiver.

According to another aspect of the present invention there is provided a transmitter-receiver system including: a camera having a transmitter for transmitting a signal for indicating an operational state of the camera; and an accessory for the camera, used separately from the camera. The accessory includes a receiver for receiving the signal and a vibrator which vibrates in accordance with the signal received by the receiver.

Preferably, the vibrator vibrates periodically and varies the period of vibrations of the vibrator to correspond to a variation in the operational state of the camera.

Preferably, the signal includes a periodic signal, the vibrator vibrating periodically to correspond to a period of the periodic signal received by the receiver.

Preferably, the signal indicates an operational state of a self-timer of the camera.

Preferably, the signal comprises a periodic signal, and wherein a period of the periodic signal varies as time lapses from when the self-timer starts operating, and wherein the vibrator vibrates periodically to correspond to a variation in the period of the periodic signal.

Preferably, the vibrator includes a motor and an eccentric rotor which is secured to a drive shaft of the motor, the center of gravity of the eccentric rotor deviating from the axis of the drive shaft.

Preferably, the camera transmits electric waves which carry the signal.

The present disclosure relates to subject matter contained in Japanese Patent Application No. 10-93914 (filed on Mar. 24, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
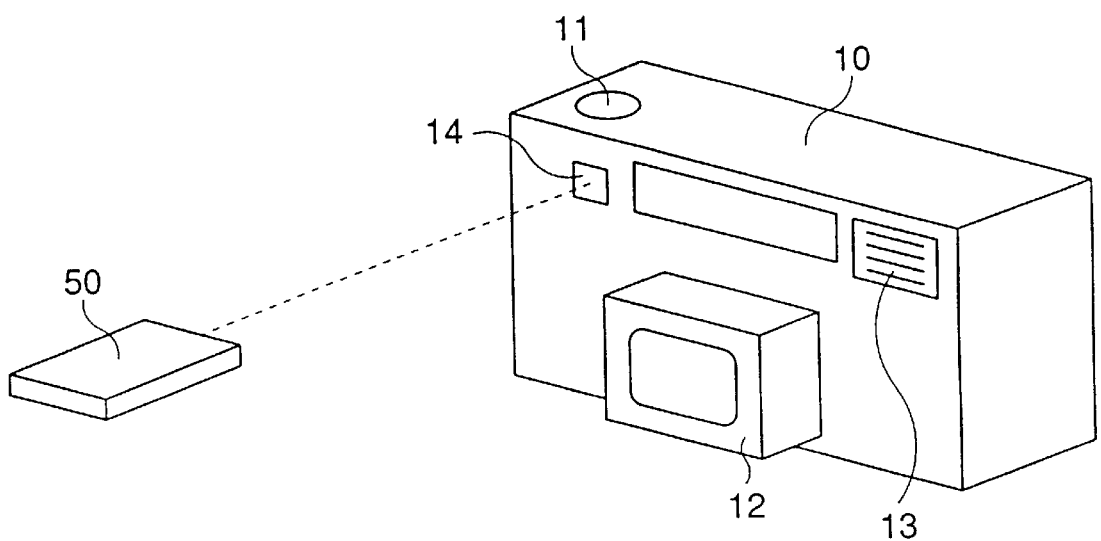
FIG. 1 is a perspective view of an embodiment of a digital camera and an accessory of the camera, to which the present invention is applied.

A digital camera 10, shown in FIG. 1, is provided on the upper face thereof with a release button 11. The digital camera 10 is provided on the front face thereof with a photographic lens 12, an electronic flash 13 and an antenna 14. The digital camera 10 is provided therein with a transmitting circuit 40 (see FIG. 2) for transmitting a signal (i.e., electric or electromagnetic waves which carry the signal) for indicating a state-of-operation of the digital camera 10. Such a signal is hereinafter referred to as a "state-indicating signal". The state-indicating signal is sent out via the antenna 14. There is provided a receiver 50 as an accessory of the digital camera 10. The receiver 50 is used separately from the digital camera 10 and receives the state-indicating signal sent from the digital camera 10. The receiver 50 is provided therein with a vibrator mechanism which is composed of a motor 51 and an eccentric rotor 53 (see FIG. 3). The vibrator mechanism vibrates periodically to correspond to the period of the state-indicating signal received from the digital camera 10. The receiver 50 can be put in a pocket of the user's clothes or can be held by their hands to inform the user (photographer) of the state of an operation of the digital camera 10.

Figure 2:
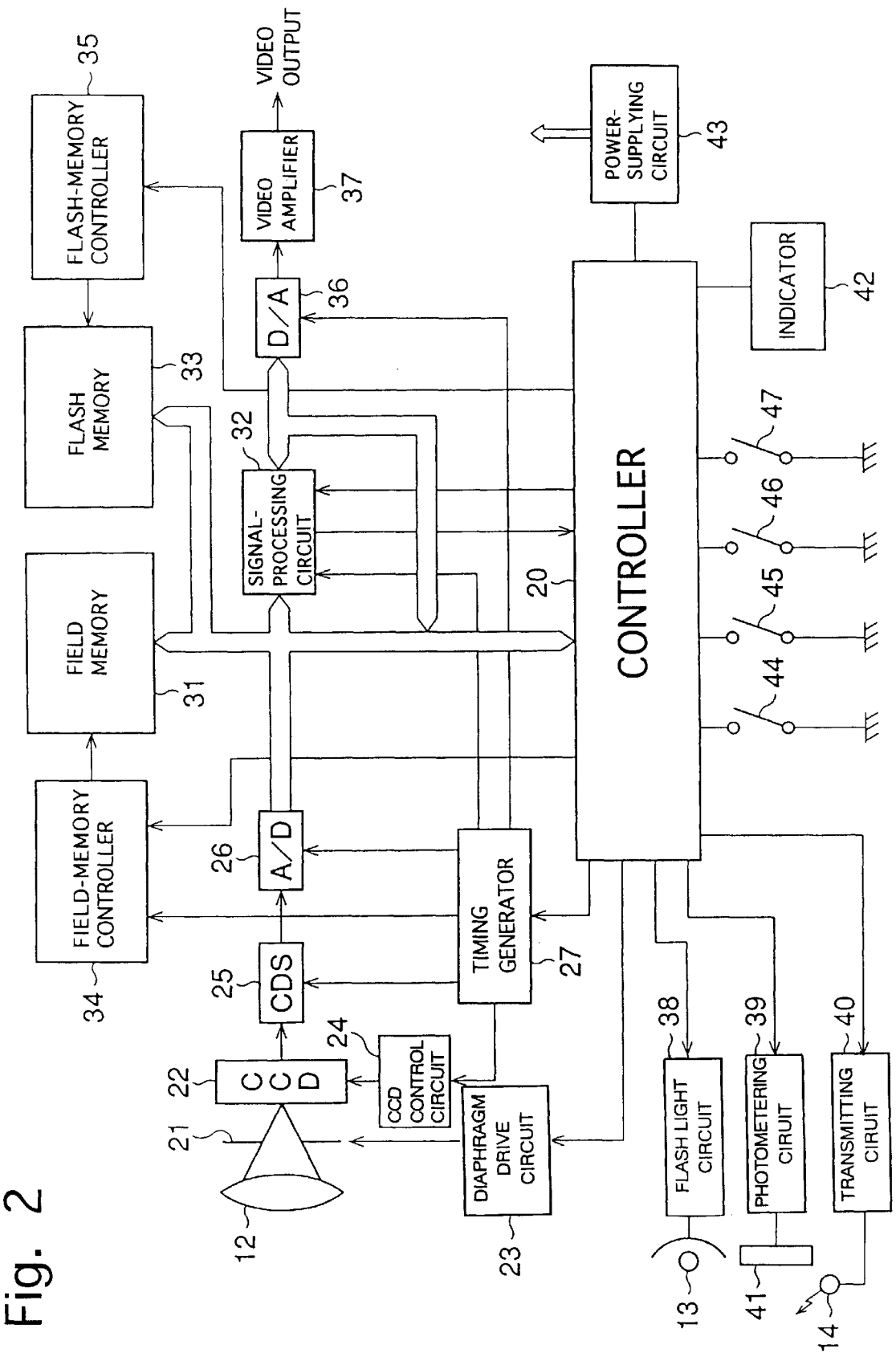
FIG. 2 is a block diagram of a circuit of the digital camera shown in FIG. 1.

The electrical circuit provided in the digital camera 10 will be hereinafter discussed with reference to FIG. 2.

The digital camera 10 is provided with a controller 20 having a microcomputer therein. The electrical circuit provided in the digital camera 10 is composed of fundamental elements/circuits including the controller 20, a CCD 22, a diaphragm drive circuit 23, a CCD control circuit 24, a CDS circuit 25, an A/D converter 26, a timing-signal generator 27, a field memory 31, a signal-processing circuit 32, a flash memory 33, a field memory controller 34, a flash memory controller 35, a D/A converter 36, a video amplifier 37, a flashlight circuit 38, a photometering circuit 39, the aforementioned transmitting circuit 40, an indicator 42, and a power-supplying circuit 43.

An iris diaphragm 21 is positioned behind the photographic lens 12, and the image pick-up device (CCD) 22 is positioned behind the iris diaphragm 21. The iris diaphragm 21 is driven by the diaphragm drive circuit 23 to vary the diameter of the center opening of the iris diaphragm 21 to thereby change the amount of light reaching the light receiving surface of the image pick-up device 22. Color image signals generated by the CCD 22 are read out in accordance with the command of the CCD control circuit 24. The color image signals read out of the CCD 22 are input to the CDS (correlation-double-sampling circuit) 25 for processing the input signals in a predetermined manner. Subsequently, the processed signals are input to the A/D converter 26 to be converted into digital signals. The CCD drive circuit 24, the CDS circuit 25 and the A/D converter 26 operate in accordance with pulse signals output from the timing-signal generator 27. The diaphragm drive circuit 23 and the timing-signal generator 27 are controlled by the controller 20.

Image signals converted into digital signals through the A/D converter 26 are temporarily stored in the field memory 31 and are thereafter read out of the field memory 31 to be converted into, e.g. luminance signals and color-difference signals. These luminance signals and color-difference signals are respectively compressed by the controller 20 therein. The compressed signals are stored in the flash memory 33. Operation of reading and writing image signals in the field memory 31 is controlled by the filed memory controller 34, and the filed memory controller 34 is controlled by the controller 20 in accordance with pulse signals output from the timing-signal generator 27. Operation of reading and writing image signals in the flash memory 33 is controlled by the flash memory controller 35, and the flash memory controller 35 is controlled by the controller 20.

Compressed image signals are read out of the flash memory 33 and subsequently expanded to be temporarily stored in the filed memory 31. Thereafter the expanded image signals (i.e., still-image signals) are read out of the filed memory 31 to be converted into composite signals by the signal-processing circuit 32. The composite signals are converted into analogue signals by the D/A converter 36 and then input to the video amplifier 37. The video amplifier 37 amplifies the input signals to output the same as video signals to an external video device (not shown).

On the other hand, the image signals, which are read out of the CCD 22 to be processed by the CDS circuit 25 and converted into digital signals by the A/D converter 26, can be output to the aforementioned external video device via the D/A converter 36 and the video amplifier 37 after the signal-processing circuit 32 applies a signal processing thereof to the input image signals, thereby a moving image can be seen on, e.g., an LCD panel or a TV monitor, which can be provided separately from or incorporated in the digital camera 10.

The flashlight circuit 38, the photometering circuit 39 and the transmitting circuit 40 are connected to the controller 20. The flashlight circuit 38 controls the flashlight emitting operation of the flashlight emitter 13. The photometering circuit 39 controls the photometering operation of a photosensor 41, connected to the photometering circuit 39, for measuring the brightness of an object. Signals output from the photosensor 41 are input to the controller via the photometering circuit 39.

The indicator 42 and the power-supplying circuit 43 are connected to the controller 20. The indicator 42 (e.g., an LCD panel) indicates various photographic information such as the number of remaining frames, self-timer information, flashlight information, exposure compensation information, and battery information. The power-supplying circuit 43 supplies power (current of a predetermined voltage) to each of the aforementioned fundamental circuits.

A power switch 44, a release switch 45, a pre-release switch 46 and a timer switch 47 are connected to the controller 20. The power switch 44 is turned ON (i.e., closed) when a power button (not shown) provided on the body of the digital camera 10 is depressed. The power-supplying circuit 43 starts supplying power to each of the aforementioned fundamental circuits when the power switch 44 is turned ON. The pre-release switch 46 and the release switch 45 are turned ON (i.e., closed) when the release button 11 is half depressed and fully depressed, respectively. The timer switch 47 is turned ON or OFF (i.e., closed or opened) by operating a photographic mode selecting switch (not shown) on the body of the digital camera 10. When the timer switch 47 is turned ON, the controller 20 actuates an internal timer thereof to perform a self-timer operation.

Figure 3:
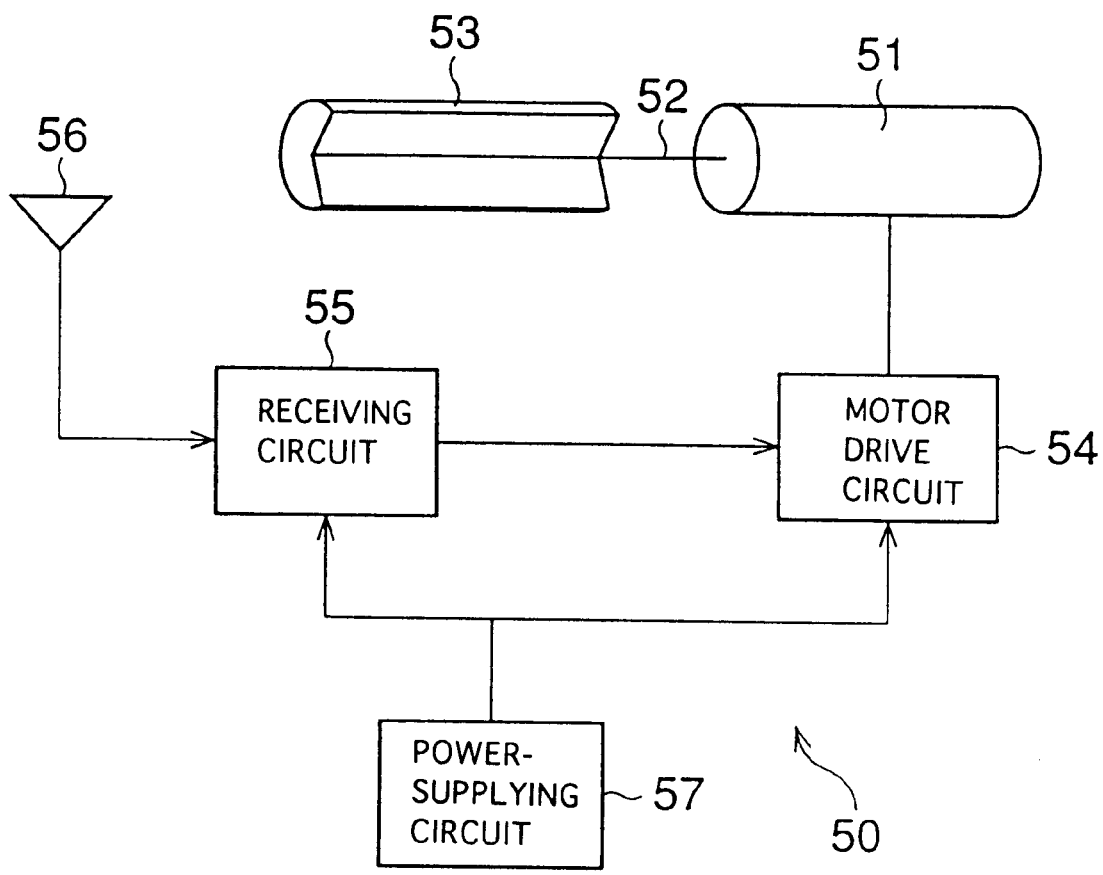
FIG. 3 is a block diagram of a receiver provided in the accessory shown in FIG. 1.

FIG. 3 shows the fundamental elements of the receiver 50. The eccentric rotor 53 is made of metal and is secured to the drive shaft (rotating shaft) 52 of the motor 51. The eccentric rotor 53 has a sector-shape cross section so that the center of gravity thereof deviates from the axis of the drive shaft 52. Therefore, the receiver 50 vibrates when the eccentric rotor 53 is rotated by the motor 51.

The receiver 50 is provided therein with a motor drive circuit 54 which is connected to the motor 51. The motor drive circuit 54 drives the motor 51. The receiver 50 is further provided therein with a receiving circuit 55 which is connected to the motor drive circuit 54; an antenna 56 which is connected to the receiving circuit 55; and a power supplying circuit 57 which is connected to both the motor drive circuit 54 and receiving circuit 55. The receiving circuit 55 can receive the state-indicating signal, which is transmitted from the antenna 14 of the digital camera 10, via the antenna 56. The motor drive circuit 54 outputs drive pulse signals having a period which corresponds to the period of the received state-indicating signal. The motor 51 rotates in accordance with the drive pulse signals output from the motor drive circuit 54. The power-supplying circuit 57 supplies power to the motor drive circuit 54 and the receiving circuit 55.

The transmitting circuit 40 generates three types of state indicating signals having different periods. Namely, the transmitting circuit 40 generates a first-state-indicating signal of a long period, a second-state indicating signal of a medium period and a third-state indicating signal of a short period (see FIG. 4).

Figure 4:
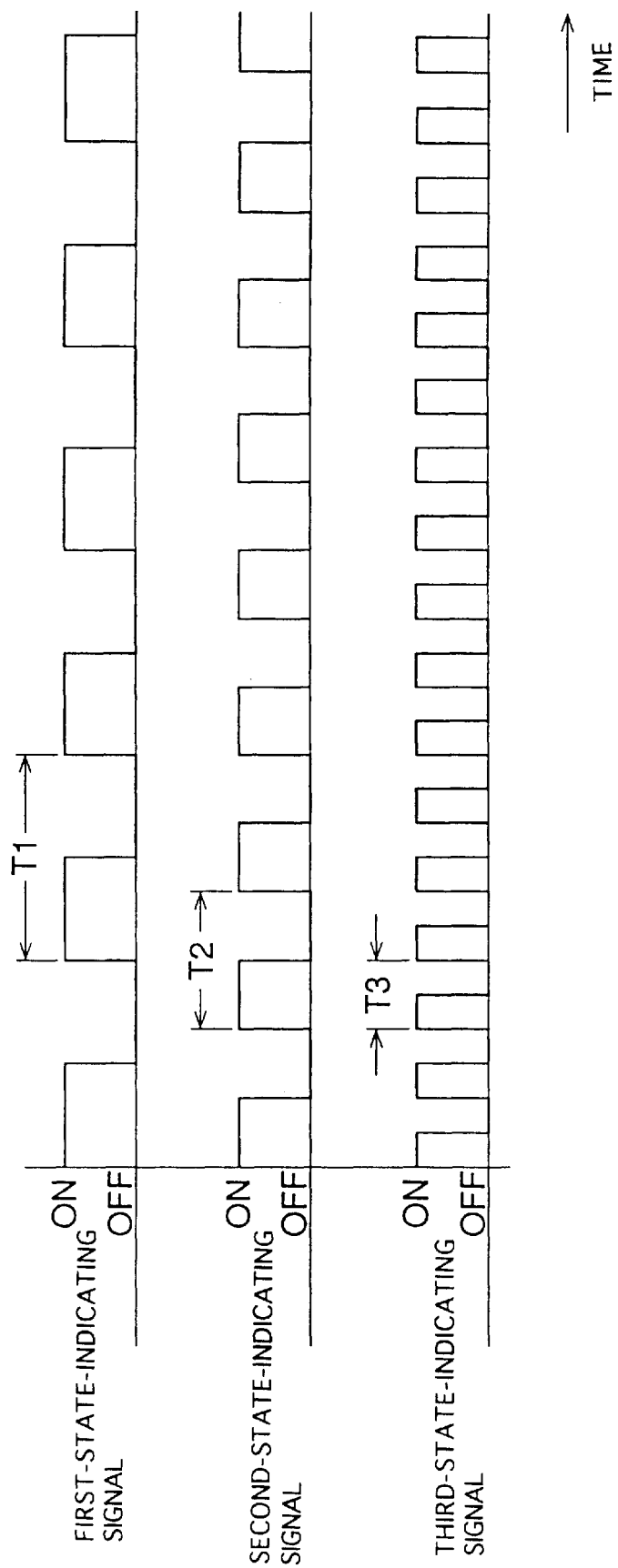
FIG. 4 is a chart showing three types of drive pulse signals which respectively correspond to three types of state-indicating signals.

FIG. 4 shows the three types of drive pulse signals which are output from the motor drive circuit 54 to correspond to the three types of state-indicating signals, respectively. Drive pulse signals having a period (long period) T1 are output from the motor drive circuit 54 while the receiving circuit 55 is receiving the first-state indicating signal. Drive pulse signals having a period (medium period) T2, which is shorter than the period T1, are output from the motor drive circuit 54 while the receiving circuit 55 is receiving the second-state-indicating signal. Drive pulse signals having a period (short period) T3, which is shorter than the period T2, are output from the motor drive circuit 54 while the receiving circuit 55 is receiving the third-state-indicating signal.

The motor drive circuit 54 controls the motor 51 to rotate the drive shaft 52 thereof by one revolution each time the drive pulse signal is turned ON. The number of revolutions of the motor 51, i.e. the number of vibrations of the receiver 50, corresponds to the frequency of the drive pulse signals.

This embodiment can be modified in such a way that the transmitting circuit 40 outputs a command signal for driving the motor 51 at a certain revolving speed or stopping the motor 51 in accordance with an operational state of the self-timer of the digital camera 10 when the self-timer starts operating (or when a predetermined period of time elapses after the self-timer starts operating) while the motor drive circuit 54 controls the motor 51 to rotate at the aforementioned certain revolving speed or stop rotating, which is determined by the command signal received by the receiving circuit 55.

Figure 5:
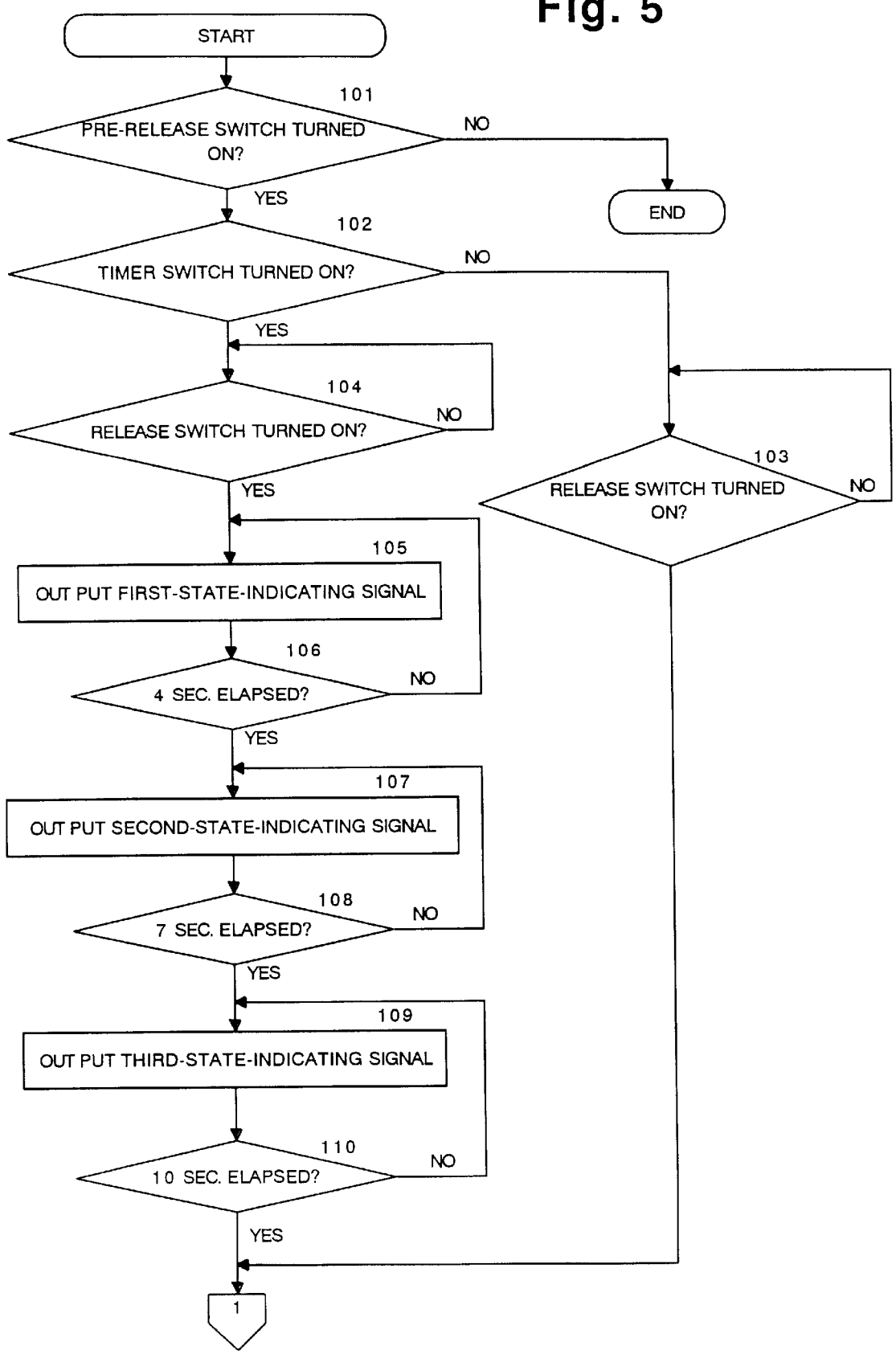
FIGS. 5 and 6 show a flow chart of a program for performing the operation of storing image signals, obtained in a photography using a self-timer, in a flash memory.
Figure 6:
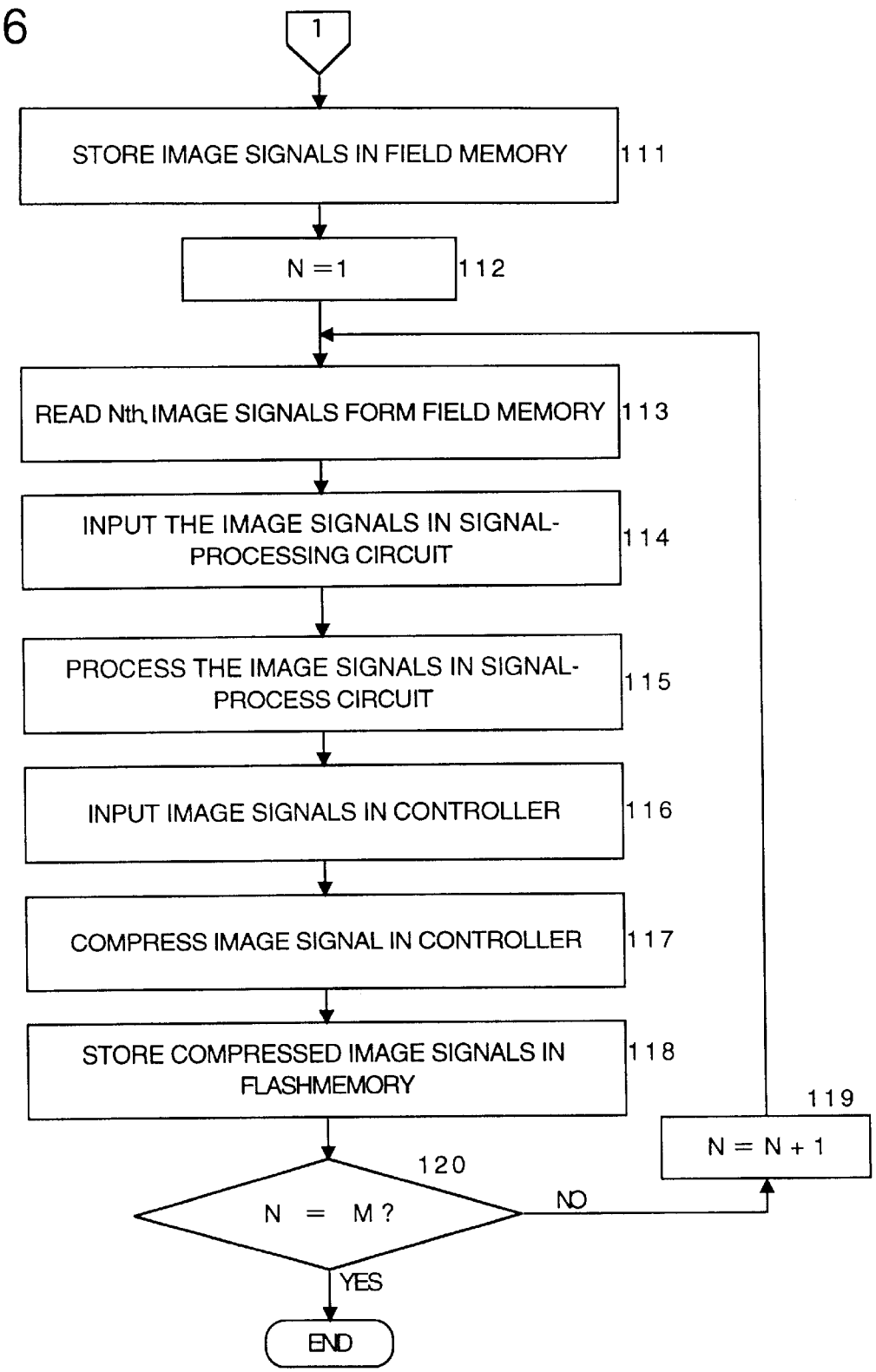
Figure 7:
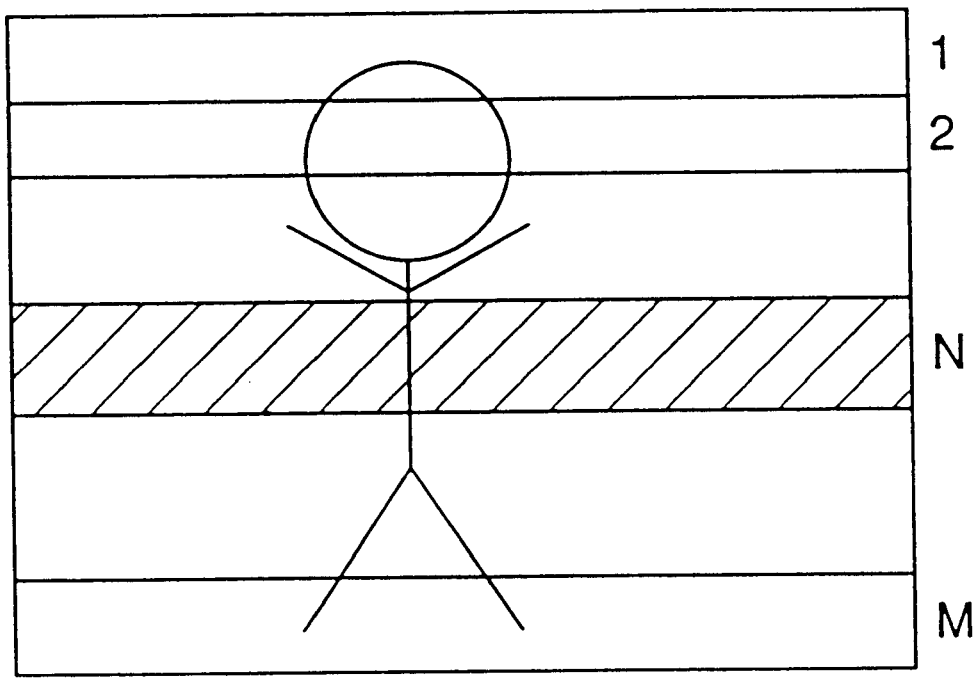
FIG. 7 is a schematic view of an image taken by the digital camera shown in FIG. 1.

FIGS. 5 and 6 show a flow chart of a program for performing the operation of storing image signals, obtained in a photography using the self-timer, in the flash memory 33. FIG. 7 shows an image taken by the digital camera 10. The operation of storing image signals will be hereinafter discussed with reference to FIGS. 5, 6 and 7.

The program expressed by the flow chart shown in FIGS. 5 and 6 is an interrupt routine which is repeatedly performed, e.g., every 100 ms. Namely, control enters the program every 100 ms. At step S101 it is determined whether the pre-release switch 46 is turned ON (i.e., whether the release switch 11 is half depressed). If the pre-release switch 46 is OFF, control ends; otherwise (from when the pre-release switch 46 is turned ON), control proceeds to step S102.

At step S102 it is determined whether the timer switch 47 is turned ON. When it is determined the timer switch is OFF, control proceeds to step S103 at which it is determined whether the release switch 45 is turned ON (i.e., whether the release switch 11 is fully depressed). Control proceeds to step S111 to immediately start performing the photographing operation (image signal storing operation) when it is determined at step S103 that the release switch 45 is turned ON; however, control repeats step S103 until the release switch 45 is turned ON.

When it is determined at step S102 that the timer switch 47 is turned ON, control proceeds to step S104 at which it is determined whether the release switch 45 is turned ON. Control proceeds to step S105 to perform the self-timer operation which includes operations at steps S105 through S110 when it is determined at step S104 that the release switch 45 is turned ON; otherwise, control repeats step S104 until the release switch 45 is turned ON. With the operations at steps S105 through S110, the shutter is released when a predetermined period of time (10 seconds in this particular embodiment) elapses after the release button 11 is fully depressed in the case where the timer switch 47 is ON.

At step S105 the first-state-indicating signal is output. Thereafter, it is determined at step S106 whether four seconds have elapsed from when the release switch 45 was turned ON at step S104. Steps S105 and S106 are repeated so as to continue to output the first-state-indicating signal until four seconds have elapsed. Therefore, during the time the operations at steps S105 and S106 are repeated, the motor drive circuit 54 of the receiver 50 outputs the drive pulse signals having the long period T1 so that the motor 51 rotates at a slow revolving speed. This makes the receiver 50 vibrate periodically at a long period T1. Such vibration having the long period T1 makes the user who holds the receiver 50 know that the self-timer is in operation and that the self-timer is currently in an initial time-counting stage.

When it is determined at step S106 that four seconds have elapsed from when the release switch 45 was turned ON at step S104, control proceeds to step S107 at which the second-state-indicating signal is output. Thereafter, it is determined at step S108 whether seven seconds have elapsed from when the release switch 45 was turned ON at step S104. Steps S107 and S108 are repeated so as to continue to output the second-state-indicting signal until seven seconds have elapsed. Therefore, during the time the operations at steps S107 and S108 are repeated, the motor drive circuit 54 of the receiver 50 outputs the drive pulse signals having the medium period T2 so that the motor 51 rotates at a medium revolving speed. This makes the receiver 50 vibrate periodically at a medium period T2. Such vibration having the medium period T2 makes the user who holds the receiver 50 know that the self-timer is in operation and that the self-timer is currently in an intermediate time-counting stage.

When it is determined at step S108 that seven seconds have elapsed from when the release switch 45 was turned ON at step S104, control proceeds to step S109 at which the third-state-indicating signal is output. Thereafter, it is determined at step S110 whether ten seconds have elapsed from when the release switch 45 was turned ON at step S104. Steps S109 and S110 are repeated so as to continue to output the third-state-indicting signal until ten seconds have elapsed. Therefore, during the time the operations at steps S109 and S110 are repeated, the motor drive circuit 54 of the receiver 50 outputs the drive pulse signals having the short period T3 so that the motor 51 rotates at a fast revolving speed. This makes the receiver 50 vibrate periodically with the short period T3. Such vibration having the short period T3 makes the user who holds the receiver 50 know that the self-timer is in operation and that the self-timer is currently in a final time-counting stage.

It can be appreciated from the foregoing that the number of vibrations of the receiver 50 increases stepwise after the release switch 45 is turned ON when the self-timer is in operation. Namely, initially the receiver 50 vibrates with a small number of vibrations per second. After four seconds have elapsed, from when the release switch 45 was turned ON, the receiver 50 vibrates at an intermediate number of vibrations per second. After seven seconds have elapsed, from when the release switch 45 was turned ON, the receiver 50 vibrates with a large number of vibrations per second.

Upon ten seconds having elapsed from when the release switch 45 was turned ON, the motor drive circuit 54 stops generating the third-state-indicting signal to perform the photographing operation. The motor 51 stops vibrating upon ten seconds having elapsed (from when the release switch 45 was turned ON) which makes the user who holds the receiver 50 know that the self-timer is over and that the shutter has been released.

At step S111 the CCD 22 is exposed to light (which passes through the photographic lens 12) by a set exposure time to generate image signals, and subsequently the image signals are processed in the aforementioned manner and thereafter stored in the field memory 31. At step S112 the counter value N in the controller 20 is set at "1" (N=1). A rectangular object image is made up of a large number of horizontal lines. In other words, a single object image is equally divided into a large number of horizontal lines. The total number of horizontal lines is M in an example shown in FIG. 7, i.e., the object image shown in FIG. 7 consists of first through $M^{th}$ horizontal lines (i.e., 1st horizontal line, 2nd horizontal line, 3rd horizontal line, _____, $N^{th}$ horizontal line, _____, and $M^{th}$ horizontal line). At steps S113 through S118 the image signals of the $N^{th}$ horizontal line are processed.

The image signals of the $N^{th}$ horizontal line are read out of the field memory 31 at step S113, and subsequently the image signals of the $N^{th}$ horizontal line are input to the signal-processing circuit 32 at step S114. At step S115 the image signals of the $N^{th}$ horizontal line are processed to be converted into (for example) luminance signals and color-difference signals. Thereafter, at step S116 the converted image signals (i.e., luminance signals and color difference signals) are input to the controller 20, and subsequently at step S117 the converted image signals are compressed. At step S118 the compressed image signals are stored in the flash memory 33.

At step S120, it is determined whether the counter value N in the controller 20 has reached the total number of horizontal lines M, i.e., whether the images signals of all the horizontal lines of a single object image have been stored in the flash memory 33. In the case where it is determined at step S120 that the counter value N in the controller 20 has not yet reached the total number of horizontal lines M, control proceeds to step S119 at which the counter value N increases by one, and control returns to step S113. On the other hand, control ends in the case where it is determined at step S120 that the counter value N has reached the total number M.

As can be understood from the foregoing, in the present embodiment the receiver 50 starts vibrating periodically with a comparatively long period due to the operation at step S105, so that the user who holds the receiver 50 can perceive that the self-timer is in operation. In addition, since the number of vibrations per second increases stepwise as time lapses, the user can expect the remaining time until the shutter is released and therefore can know when the shutter is released.

According to the present embodiment, the receiver 50 is provided with a function of informing the user that the self-timer is in operation by vibrating the receiver 50, the user can perceive that the self-timer is in operation without keeping an eye on the camera. Furthermore, when the self-timer is in operation, neither the digital camera 10 nor the receiver 50 delivers any audible signal for informing the user that the self-timer is in operation, the self-timer can be used even in an area where making sound or noise is not preferable. The self-timer of the digital camera 10 can also be used in a noisy area because the self timer is not reliant on a conventional type of audible signal to inform the user that the self-timer is in operation.

In the aforementioned embodiment of the digital camera 10, the vibrator mechanism is used solely for the self-timer of the digital camera 10; however, the same mechanism can be used for any other operation of the digital camera 10. For instance, it is possible to make the receiver 50 vibrate to let the user know a currently-set exposure compensation value when the digital camera 10 is in the exposure compensation mode thereof. In this case, it is possible to let the user know the exposure compensation value by varying the number of vibrations per second in accordance with an increment or decrement of the exposure compensation value. In the case where the camera is provided with an image size changing device for selectively changing the image size between a regular size and a panoramic size, it is possible to make the receiver 50 vibrate to let the user know which image size is currently selected. It is also possible to make the receiver 50 vibrate to let the user know whether the flashlight is compulsively driven to fire or prohibited from firing for the following shot.

In the aforementioned embodiment, the transmitting circuit 40 generates three types of state-indicating signals having different (pulse) periods. However, the present invention is not limited solely to the specific number of state-indicating signal types described above (i.e., three state-indicating signals); a similar effect can be expected even if the transmitting circuit 40 generates less than, or more than three types of state-indicating signals having different (pulse) periods.

The transmitter-receiver system of the present embodiment can be adopted not only to a digital camera but also a conventional camera using photosensitive film (e.g., 35 mm roll film), or any other type of camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An accessory for a camera which is used separately from said camera, said camera transmitting a signal for indicating an operational state of said camera, wherein said accessory comprises:
   a receiver for receiving said signal; and
   a vibrator which vibrates in accordance with said signal received by said receiver.

2. The accessory according to claim 1, wherein said vibrator vibrates periodically and varies the period of vibrations of said vibrator to correspond to a variation in said operational state of said camera.

3. The accessory according to claim 2, wherein said signal comprises a periodic signal, said vibrator vibrating periodically to correspond to a period of said periodic signal received by said receiver.

4. The accessory according to claim 2, wherein said signal indicates an operational state of a self-timer of said camera.

5. The accessory according to claim 4, wherein said signal comprises a periodic signal, and
   wherein a period of said periodic signal varies as time lapses from when said self-timer starts operating, and
   wherein said vibrator vibrates periodically to correspond to a variation in the period of said periodic signal.

6. The accessory according to claim 1, wherein said vibrator comprises a motor and an eccentric rotor which is secured to a drive shaft of said motor, the center of gravity of said eccentric rotor deviating from the axis of said drive shaft.

7. The accessory according to claim 1, wherein said camera transmits electric waves which carry said signal.

8. A transmitter-receiver system comprising:
   a camera comprising a transmitter for transmitting a signal for indicating an operational state of said camera; and an accessory for said camera, used separately from said camera, wherein said accessory comprises:

a receiver for receiving said signal; and a vibrator which vibrates in accordance with said signal received by said receiver.

9. The transmitter-receiver system according to claim 8, wherein said vibrator vibrates periodically and varies the period of vibrations of said vibrator to correspond to a variation in said operational state of said camera.

10. The transmitter-receiver system according to claim 9, wherein said signal comprises a periodic signal, said vibrator vibrating periodically to correspond to a period of said periodic signal received by said receiver.

11. The transmitter-receiver system according to claim 9, wherein said signal indicates an operational state of a self-timer of said camera.

12. The transmitter-receiver system according to claim 11, wherein said signal comprises a periodic signal, and wherein a period of said periodic signal varies as time lapses from when said self-timer starts operating, and wherein said vibrator vibrates periodically to correspond to a variation in the period of said periodic signal.

13. The transmitter-receiver system according to claim 8, wherein said vibrator comprises a motor and an eccentric rotor which is secured to a drive shaft of said motor, the center of gravity of said eccentric rotor deviating from an axis of said drive shaft.

14. The transmitter-receiver system according to claim 8, wherein said camera transmits electric waves which carry said signal.

* * * * *